US012545574B2

(12) United States Patent
Büning et al.

(10) Patent No.: US 12,545,574 B2
(45) Date of Patent: Feb. 10, 2026

(54) LIQUID DISPENSER, TAP SYSTEM HAVING A LIQUID DISPENSER AND LIQUID CONTAINER, AND METHOD FOR USING A LIQUID CONTAINER

(71) Applicant: Büning & Partner KG, Hamburg (DE)

(72) Inventors: Engelbert Büning, Hamburg (DE); Tom Augustin, Hamburg (DE); Jan Hvarling, Hamburg (DE); Oliver Renelt, Hamburg (DE)

(73) Assignee: Büning & Partner KG, Hamburg (DE)

( * ) Notice: Subject to any disclaimer, the term of this patent is extended or adjusted under 35 U.S.C. 154(b) by 224 days.

(21) Appl. No.: 18/264,463

(22) PCT Filed: Jan. 19, 2022

(86) PCT No.: PCT/EP2022/051116
§ 371 (c)(1),
(2) Date: Aug. 7, 2023

(87) PCT Pub. No.: WO2022/167222
PCT Pub. Date: Aug. 11, 2022

(65) Prior Publication Data

US 2024/0116743 A1 Apr. 11, 2024

(30) Foreign Application Priority Data

Feb. 8, 2021 (DE) ..................... 10 2021 000 632.1

(51) Int. Cl.
*B67D 3/00* (2006.01)

(52) U.S. Cl.
CPC ......... *B67D 3/0054* (2013.01); *B67D 3/0067* (2013.01); *B67D 2210/00031* (2013.01)

(58) Field of Classification Search
CPC ................ B67D 3/0054; B67D 3/0067; B67D 2210/00031; B67D 3/0029; B67D 3/043; B67D 3/0009; B67D 2001/0827
See application file for complete search history.

(56) References Cited

U.S. PATENT DOCUMENTS 6,056,157 A 5/2000 Gehl et al.
6,269,980 B1 8/2001 Randall et al.
(Continued)

FOREIGN PATENT DOCUMENTS

CN 205972348 U 2/2017
DE 202012100722 U1 6/2013
EP 2634134 A2 * 9/2013 ........... B67D 3/0009

OTHER PUBLICATIONS

"International Search Report corresponding to International Application No. PCT/EP2022/051116 mailed May 9, 2022".
(Continued)

*Primary Examiner* — Donnell A Long
(74) *Attorney, Agent, or Firm* — Myers Bigel, P.A.

(57) ABSTRACT

A liquid dispenser (1) for receiving a liquid container and for dispensing a liquid from the liquid container, wherein the liquid dispenser has a housing (2) into which the liquid container is insertable and wherein the housing has, in a liquid dispensing region: a guide device (4), by means of which a liquid dispensing device of the liquid container is able to be guided during the insertion of the liquid container into the housing (2); and an actuating device (8), by means of which the liquid dispensing device is able to be actuated to dispense the liquid from the liquid container.

17 Claims, 15 Drawing Sheets

(56) References Cited

U.S. PATENT DOCUMENTS

Figure 1:
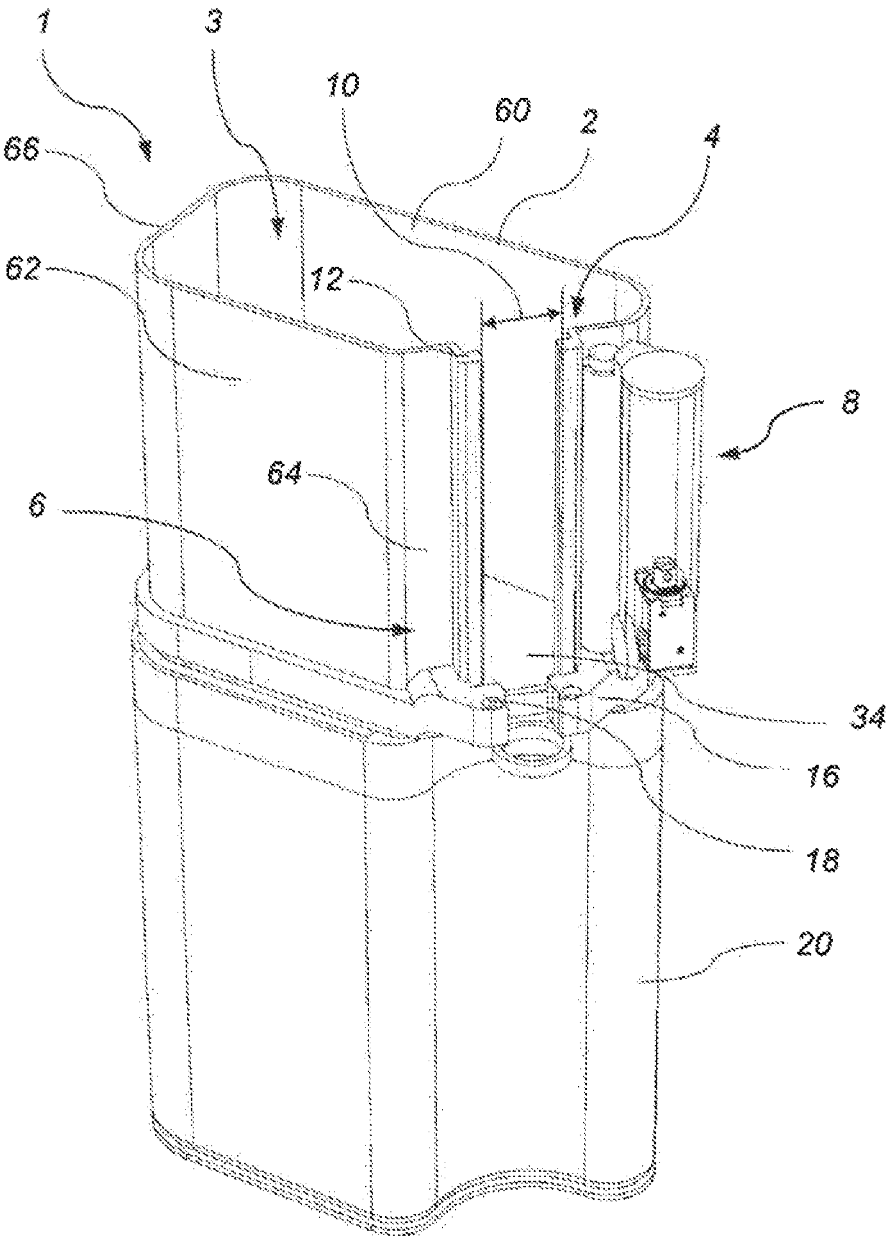

| | | | | |
|---|---|---|---|---|
| 6,708,741 | B1 | 3/2004 | Berry et al. | |
| 7,975,879 | B2 * | 7/2011 | Groesbeck ........... | B67D 3/0022 220/592.2 |
| 2002/0121527 | A1 | 9/2002 | Good | |
| 2008/0314927 | A1 | 12/2008 | Martin | |
| 2009/0308492 | A1 * | 12/2009 | Benvenuto ........... | B67D 3/0025 222/183 |

OTHER PUBLICATIONS

"Office Action corresponding to German Application No. 1020210006321 mailed Jan. 19, 2022".

* cited by examiner

LIQUID DISPENSER, TAP SYSTEM HAVING A LIQUID DISPENSER AND LIQUID CONTAINER, AND METHOD FOR USING A LIQUID CONTAINER

RELATED APPLICATION

The present application is a 35 U.S.C. § 371 national phase application of PCT Application PCT/EP2022/051116, filed Jan. 19, 2022, which claims priority to German Patent Application No. 10 2021 000 632.1, filed Feb. 8, 2021, the entire content of each of which is incorporated herein by reference.

The invention relates to a liquid dispenser for receiving a liquid container, a tap system having a liquid dispenser and a liquid container, and a method for inserting a liquid container into a liquid dispenser.

Tap systems are known, being used for tapping beverages, such as fruit juice, vegetable juice, or wine. Typically, beverage bags are used which come with a tap and which can be stabilized by means of a box, with the tap protruding through an opening in the box (https://www.derkarton.net/Lebensmittel-und-Getraenkeversand/Bag-in-Box/Komplett-sets-Bag-in-Box.html).

It is the object of the present invention to provide a liquid dispenser, a tap system having a liquid container which is insertable into a liquid dispenser, and a method for inserting a liquid container into a liquid dispenser, such that storage of the liquid to be dispensed and/or dispensing the liquid are improved.

The object is achieved by the subject matter of the respective independent claim. The respective dependent patent claims relate to preferred modifications of the subject matter of the present invention.

One aspect relates to a liquid dispenser for receiving a liquid container and for dispensing a liquid from the liquid container, wherein the liquid dispenser has a housing into which the liquid container is insertable and wherein the housing has, in a liquid dispensing region: a guide device, by means of which a liquid dispensing device of the liquid container is able to be guided during the insertion of the liquid container into the housing; and an actuating device, by means of which the liquid dispensing device is able to be actuated to dispense the liquid from the liquid container.

One benefit of the present invention is a simplified exact positioning of the liquid container in the liquid dispenser, so that storing and/or dispensing the liquid is improved. Furthermore, the liquid can be dispensed in such a way that the liquid does not come into contact with the liquid dispenser. In this way, a hygienically safe dispensing of the liquid can be achieved, and any liquid residue adhering to the liquid dispenser is reduced or prevented.

The liquid dispensing region can be a region of the housing intended for dispensing the liquid and having at least one configuration for dispensing the liquid. In particular, the liquid dispensing region can extend over a spatially defined section of the housing.

For example, the liquid dispensing region can be formed at a preferably beveled corner of the housing in the case of a substantially rectangular housing including the liquid dispensing region. Preferably, the housing can have a receiving space, wherein in the position of use of the liquid dispenser the liquid container is preferably able to be inserted in a vertically downward directed movement into the receiving space.

Furthermore, the receiving space can be bounded downward in the vertical direction by a bottom, on which the liquid container inserted in the liquid dispenser preferably rests. Viewed in the position of use of the liquid dispenser, the receiving space is bounded laterally or horizontally at least in sections by side walls of the housing, wherein the liquid container inserted in the receiving space abuts at least in sections against the inside of the side walls. In particular, a first side wall and a second side wall of the receiving space can be arranged opposite each other, preferably running substantially parallel to each other and/or vertically. Viewed in the position of use of the liquid dispenser, the first side wall and, second side wall can have different lengths in the horizontal direction. Furthermore, a preferably vertically running third side wall of the receiving space may have the guide device and connect the first side wall to the second side wall. Furthermore, a preferably vertically running fourth side wall of the receiving space can be arranged opposite the third side wall and connect the first side wall to the second, side wall. Preferably, the third and fourth side walls are not arranged parallel to each other, in order to form the beveled corner. In particular, the third side wall can be oriented or arranged such, in regard to the first and second side walls, that corresponding planes formed by the first, second, and third side wall are not perpendicular to each other. Furthermore, the fourth side wall can be oriented or arranged such, in regard to the first and second, side walls, that corresponding planes formed by the first, second, and fourth side walls are perpendicular to each other. Preferably, the transitions between the side walls and/or towards the bottom are rounded. This ensures a better accessibility to the liquid dispensing region. Furthermore, the liquid container can abut better against the inside of the housing.

Preferably, the side walls and/or the bottom can be made at least in sections and/or entirely of a thermal insulation material. Thus, advantageously, a thermal insulation of the liquid container can be achieved, so that the energy consumption for reaching and maintaining a target temperature of the liquid of the liquid container can be reduced, for example.

The guide device can be designed for guiding, especially transversely, a liquid dispensing device to be guided. For example, the guide device can be configured as a straight guide.

The liquid dispensing device can be designed as a valve having a valve housing and a valve opening element, wherein the valve opening element protrudes from the valve housing and is connected to a valve body arranged in the valve housing—especially as a single piece.

In particular, the liquid dispensing device can be designed as a mechanically or electromechanically opening and/or closing valve, for example, as a tap having a mechanically or electromechanically shiftable valve body for closing or opening a dispensing opening of the valve, i.e., for opening or closing the tap.

For example, actuating the liquid dispensing device—viewed in the position of use of the liquid dispensing device—can be done by pushing or moving the valve opening element relative to the valve housing of the liquid dispensing device. The valve body will then be lifted up from its given—especially spring-loaded—closing position with a dispensing opening of the valve housing into an opening position. Alternatively, actuating can be done by pushing down the valve housing of the liquid dispensing device relative to the valve opening element.

The actuating device can be designed as a mechanical, electromechanical, hydraulic or pneumatic actuating device. Furthermore, the actuating device can be designed to allow slowly opening the liquid dispensing device, so that dispensing the liquid is especially well measurable. For example, the actuating device can have a coupling rod, which mechanically applies an actuating force for the actuation of the liquid dispensing device to the liquid dispensing device. Alternatively, the actuation can be done by means of an operating element which is electrically connected to an actuator, which actuates the liquid dispensing device. The actuator can be designed, for example, as a servo motor or a lift cylinder, and the liquid dispensing device can be actuated for example by means of a piston or a camshaft.

The following terms used: "top", "above" or "up" and the like mean in the sense of the present invention a direction and/or a position of an element in relation to another element against the direction of gravity. The following terms used: "bottom", "below" or "down" and the like mean in the sense of the present invention a direction and/or a position of an element in relation to another element in the direction of gravity.

In particular, the guide device can be designed as guide rails arranged opposite each other and spaced apart from each other. Thus, an effective—in particular, vertical—longitudinal guide can be realized in a simple manner.

For example, the guide rails may be substantially U-shaped in cross section.

Advantageously, the respective openings of the guide rails can be facing each other.

Alternatively or additionally, the guide rails can be substantially rectangular in cross section and preferably have a width (facing sides of the guide rails) of about 6 mm to 10 mm and preferably about 8.5 mm.

Advantageously, the respective narrower sides of the guide rails can be facing each other.

The above configuration can help to realize an effective lengthwise guiding of the liquid dispensing device in a simple manner.

The guide rails can have an effective spacing from each other of about 25 mm to 40 mm, preferably about 30 mm to 35 mm, and particularly preferably about 33 mm. Furthermore, the guide rails can have a length of at least 100 mm. Preferably, the length of the guide rails is at most 200 mm, and particularly preferably at most 160 mm.

For example, in the case of guide rails U-shaped in cross section, the effective spacing is measured to the bottom of the U-shaped opening. In particular, in the case of the guide rails rectangular in cross section, the effective spacing can correspond to the clear spacing between the guide rails.

The actuating device can be arranged on a removable cover of the housing for shifting between an insertion position for inserting the liquid container and an actuating position for actuating the liquid dispensing device.

Alternatively, the actuating device can be arranged pivotably on the housing for shifting between the insertion position and the actuating position.

In particular, the actuating device can be attached to the cover such that the guide device can be released by removing the cover from the housing for inserting the liquid container. Furthermore, the actuating device can be arranged for actuating the liquid dispensing device by placing the cover on the housing.

Advantageously, the liquid dispensing device can, when the cover is placed on the housing, be blocked, in particular by the actuating device, from moving against the inserting direction of the liquid container. In other words, the liquid container can, when the cover is placed on the housing, be prevented from being removed from the housing by the actuating device.

In particular, the actuating device can be attached to the housing such that the guide device is releasable by means of a swinging open the actuating device for inserting the liquid container. Furthermore, the actuating device can be arranged for actuating the liquid dispensing device by means of a swinging shut the actuating device.

Advantageously, the liquid dispensing device can be blocked by the swung-shut actuating device from a movement against the inserting direction of the liquid container. In other words, the liquid container and/or the liquid dispensing device can be prevented from being removed from the housing by means of the swing-shut actuating device.

Regardless of the design of the actuating device, the cover in an exemplary embodiment can have an circumferential side wall, which covers the housing circumferentially at least partly—in particular preferably entirely—when the cover is in place. Preferably, the cover can cover or at least in sections enclose the receiving space. Furthermore, the cover may comprise a thermal insulating material, in order to insulate the receiving space.

The liquid dispensing device can be operable mechanically or electromechanically by the actuating device.

Furthermore, regardless of the design of the actuating device, the actuating device can be operable by means of an operating element arranged on the cover. For example, the operating element can be designed as a push button, the actuation of which, for example by a user, results in dispensing liquid. In particular, the actuating device can be operable by the operating element such that a liquid will be dispensed for the duration of the actuation of the operating element or the push button. Alternatively, the liquid dispenser can be designed so that a predefined quantity or definable quantity of liquid is dispensed when the operating element is actuated. In other words, the dispensed quantity of liquid is not determined primarily by the duration of the actuation of the operating element, but merely by the actuation.

The bottom of the housing, on which the liquid container preferably rests when inserted in the liquid dispenser, can have a slope in the direction toward the liquid dispensing region.

The bottom can have a slope of at least about 2%, preferably at least about 4% and particularly preferably at least about 8%. Furthermore, the slope can be at most about 18%.

In particular, the slope can be formed in multiple levels, in particular three, or shaped as a funnel. For example, the bottom can be V-shaped or fall off in shape of a cylinder or cone sliced open lengthwise in the direction toward the liquid dispensing region.

Advantageously, a tapping opening of the liquid container inserted in the liquid dispenser, to which the liquid dispensing device is connected, is the lowest point of the liquid container in the housing.

Thus, a residual amount of the liquid of the liquid container inserted in the liquid dispenser can collect at the lowest point of the housing in the liquid dispensing region and be available for removal from the liquid container.

Advantageously, the liquid container inserted in the liquid dispenser can be almost emptied entirely due to the fact that the bottom has a slope.

Advantageously, a recess can be formed at the bottom in the liquid dispensing region, in order to create a place in the liquid dispensing region for the valve housing of the liquid dispensing device—in particular when pushed down by actuation of the liquid dispensing device.

The above configuration can help to improve the storage of the liquid to be dispensed and/or dispensing the liquid in a simple manner.

Advantageously, a heating and/or cooling element, such as a Peltier element, can be arranged at the bottom, in particular below the bottom, in order to heat or cool the liquid in the liquid container inserted in the housing. In this way, the temperature of the liquid to be stored and/or dispensed can be influenced and thus the storage and/or dispensing of the liquid can be further improved. Preferably the surface of the inside of the housing facing toward the liquid container used can have a thermal conductivity of at least 15λ (W/mK) at 20° C., preferably at least 100λ at 20° C. Thus, advantageously, a good temperature distribution of the temperature dictated by the cooling and/or heating element around the liquid container can be achieved. For example, the surface of the side walls and/or the bottom can be made at least for a portion from an alloy containing aluminum.

In particular, a power supply of the Peltier element can be accommodated in a frame housing, and the housing of the liquid dispenser can be placed on the frame housing. In this way, a height of the housing and thus a height of the liquid dispensing device of the liquid container inserted in the housing can be influenced with a height extension of the frame housing and the storage and/or dispensing the liquid can be further improved. The liquid dispenser or the frame housing can moreover have an energy storage for power supply, so that the liquid dispenser can also be operated without a power grid. This allows a portable operation as well as maintaining heating or cooling in the event of a power outage of the power grid.

Preferably, the target temperature for controlling the heating and/or cooling element can be set exactly. Preferably, it can be provided further that an automatic interruption of the temperature control will occur when the cover is removed from the housing and/or an automatic continuation of the temperature control will occur when the cover is placed on the housing.

In particular, the housing of the liquid dispenser can be arranged by means of the frame housing at such a height that a collecting vessel for collecting the liquid dispensed from the liquid dispenser can be placed under the housing—in particular under the liquid dispensing device.

The power supply can also in particular energize a remaining quantity display and/or a temperature display for the liquid in the liquid container. For example, a weight sensor can be arranged on the bottom of the housing as the pickup for the remaining quantity display and/or a temperature sensor can be arranged on the bottom of the housing or in another suitable location of the housing as the pickup for the temperature display. The remaining quantity display and/or the temperature display can be arranged on the housing and/or on the cover.

Advantageously, the housing of the liquid dispenser can be releasably fastened to the frame housing.

In the liquid dispensing region, an end stop can be formed, by means of which the liquid dispensing device of the liquid container can be positioned at its end position.

In other words, an end stop can be formed in the liquid dispensing region, by means of which the liquid dispensing device of the liquid container can be prevented from further movement in the inserting direction of the liquid container.

Advantageously, the end stop can be formed on the housing or on the guide device.

The above configuration can further help to ensure in a simple manner the positioning of the liquid dispensing device of the liquid container inserted in the liquid dispenser which is suitable for the liquid dispensing, thereby improving the storage of the liquid to be dispensed and/or dispensing the liquid.

Furthermore, a liquid container is disclosed, from which liquid can be withdrawn by means of a liquid dispensing device, wherein a guide flange is provided on the liquid dispensing device, by means of which the liquid container is able to be guided and inserted into a previously described liquid dispenser, the guide flange cooperating with a guide device of the liquid dispenser.

The benefits mentioned for e above described liquid dispenser apply accordingly to the liquid container.

The guide flange of the liquid container can be formed with a rectangular cross section on its outer circumference.

Alternatively, the guide flange of the liquid container can be formed with a U-shaped cross section.

In particular, the guide flange, viewed from the front, can be substantially round or substantially oval. Preferably, the guide flange can be formed complementary to the guide rails and can have an effective outer diameter of about 25 mm to 40 mm, preferably about 30 mm to 35 mm and particularly preferably about 33 mm. Moreover, the effective outer diameter of the guide flange can be minimally smaller than the effective spacing of the guide rails.

In particular, in the case of the guide flange which is rectangular in cross section, an effective outer diameter can correspond to the outer diameter of the guide flange. For example, in the case of a guide flange which is U-shaped in cross section, the effective outer diameter will be measured to the bottom of the U-shaped opening.

The liquid dispensing device of the liquid container can have at least one valve opening element by means of which the liquid dispensing device can be positioned in its end, position in the liquid dispenser against an end stop of the liquid dispenser.

In other words, the liquid dispensing device can have at least one valve opening element by means of which, cooperating with the end stop, the liquid dispensing device can be prevented from further movement in the inserting direction of the liquid container.

In particular, the valve opening element can be prevented by means of form fit with the end stop from a further movement in the inserting direction of the liquid container.

The above configuration can further help to ensure in simple manner the positioning of the liquid dispensing device of the liquid container inserted in the liquid dispenser which is suitable for the liquid dispensing, thereby improving the storage of the liquid to be dispensed and/or dispensing the liquid.

For example, the at least one valve opening element can be formed protruding at the side of the liquid dispensing device and in the end position of the liquid dispensing device it can abut against the end stop. In an exemplary embodiment, the valve opening element may have a positioning section, with which the liquid dispensing device can be aligned with a complementary positioning section of the end stop. Advantageously, the positioning section of the valve opening element and the complementary positioning section make it possible for the liquid dispensing device to be positioned exactly in regard to the guide device and/or actuating device. In this way, it is possible to prevent shifting the liquid dispensing device and to actuate the liquid dispensing device exactly. Furthermore, the positioning section of the valve opening element can have at least two positioning elements, which cooperate with complementary positioning elements of the end stop in order to further stabilize the liquid dispensing device in its horizontal position relative to the end stop. In particular, the positioning elements can be arranged symmetrically in regard to the valve housing and/or engage with each other.

The positioning section of the valve opening element can have, for example, a positively cone-shaped positioning element and at the end stop there can be formed a correspondingly negatively cone-shaped receiving section or positioning element, in which the valve opening element is received by its positioning section in the end position of the liquid dispensing device.

In a further embodiment, it can be provided that the actuating device, especially when it is mounted pivotably on the housing, is designed to fix the position of the liquid dispensing device in relation to the housing in the actuating position of the actuating device for actuating the liquid dispensing device. In particular, in the actuating position the actuating device can contact the top of the valve housing, in order to prevent a movement of the liquid dispensing device against the inserting direction. Furthermore, the actuating device can be designed to lift up the valve opening element of the liquid dispensing device, viewed in the position of use of the liquid dispenser, for dispensing the liquid. Furthermore, it can be provided that the valve housing in the end position of the liquid dispensing device abuts against the end stop and the valve opening element is movable relative to the housing.

Furthermore, the actuating device can have an operating lever mounted rotatably about a first axis of rotation, a rocker arm mounted rotatably about a second axis of rotation, running substantially parallel to the first axis of rotation, and a force transmitting element. The force transmitting element can be changed in its position by the operating lever and is connected to a first side of the rocker arm, viewed from the second axis of rotation. Furthermore, a second side of the rocker arm, viewed from the second axis of rotation, can actuate the valve opening element of the liquid dispensing device. In particular, the force transmitting element can be shifted by the operating lever substantially along the inserting direction. The operating lever can be operated in particular by a user in order to cause dispensing the liquid. It can be provided, in particular, for dispensing the liquid, that the operating lever, designed preferably as a one-sided lever, is moved in the direction of the inserting direction or downward, which produces a corresponding shifting in position of the force transmitting element. As a result, the second side of the rocker arm is shifted against the inserting direction, so that the valve opening element is likewise moved against the inserting direction, and dispensing the liquid ensues.

Preferably, it can be provided that the force transmitting element has an operating lever opening or bushing, through which the operating lever is guided out of the housing. Furthermore, a contact surface of the operating lever at the side of the force transmitting element, with which a force is exerted on the contact surface of the force transmitting element at the lever side for dispensing the liquid, runs substantially in a straight line, and the contact surface at the operating lever side has a curved profile. Upon actuating the operating lever for dispensing the liquid, the contact surface at the side of the force transmitting element can be guided at least in sections along the contact surface at the side of the operating lever. Due to the curved profile of the contact surface at the side of the operating lever, said contact surface can slide particularly easily along the contact surface at the side of the force transmitting element, contributing to an easy operability of the actuating device.

Preferably, the liquid dispenser can have a grommet quick connector for coupling a grommet, the grommet being designed as a spray protection against the liquid dispensed by the liquid dispensing device.

In particular, the grommet can be arranged below the liquid dispensing device and is releasable from and connectable to the grommet quick connector by a rotary movement. Furthermore, the length of the grommet near the housing can be longer than the outside length.

Preferably, the liquid dispenser can have a stand with a bearing surface, which in a positioning of the liquid dispenser on a substantially flat positioning surface as intended, makes contact with same, the bearing surface, viewed top down on the liquid dispenser, being arranged outside the footprint of the top side of the liquid dispenser. The positioning surface can be, for example, a table top or kitchen work top. Furthermore, the liquid dispenser can have on its bottom side at least three, preferably at least four further bearing points, with which the liquid dispenser contacts the positioning surface, the further bearing points being distributed within the footprint. The bearing surface is situated in particular in the region of the actuating device, in order to stabilize the liquid dispenser on the positioning surface and prevent the liquid dispenser from tipping over when the actuating device is actuated and especially when the operating lever is actuated.

The liquid container can be largely flexible in shape and be formed in particular as a bag. For example, the bag can be made from two or more film elements which are joined together, for example, by welding and/or gluing, in order to form the liquid container. The film elements which form the wall of the liquid container can be multilayered, for example, and/or be made as plastic film. The liquid container or the film elements can moreover have an oxygen barrier in order to reduce the diffusion of oxygen into the container or into the liquid contained therein. In particular, the film elements can be made of polyethylene terephthalate (PET), aluminum, and/or low-density polyethylene (LOPE).

Furthermore, the liquid container, in particular in the unfilled state, can have a rectangular shape, wherein the liquid dispensing device—viewed top down on the liquid container—can be formed preferably in a corner region of the liquid container.

This further contributes to a remaining quantity of liquid of the liquid container inserted in the liquid dispenser collecting at the lowest point of the housing in the liquid dispensing region and being available for removal from the liquid container.

Furthermore, the liquid container can hold at least 1 L (liter) of liquid, preferably at least 1.5 L of liquid, and particularly preferably at least 2 L of liquid. Preferably, the maximum capacity of the liquid container is limited to about 10 L, preferably about 5 L and particularly preferably about 3 L.

The above configuration can further help to improve in simple manner the storage of the liquid to be dispensed and/or dispensing the liquid.

The liquid to be stored and/or dispensed can preferably be a liquid suitable for human consumption, such as fruit juice, vegetable juice, or wine.

A further aspect relates to a tap system having a previously described liquid dispenser, in which a previously described liquid container is inserted.

The benefits of the tap system with the liquid dispenser and the liquid container result accordingly from the features and benefits mentioned for the above described liquid dispenser and liquid container.

An actuating direction of a liquid dispensing device of the liquid container—viewed from its position of use—and a dispensing direction of the liquid can be vertically oriented.

A further aspect of the invention relates to a method for inserting a previously described liquid container into a previously described liquid dispenser, including the step of:

inserting the liquid container into the housing, the guide flange of the liquid container being guided by means of the guide device of the housing.

The benefits of the method of inserting the liquid container in the liquid dispenser result accordingly from the features and benefits mentioned for the above described liquid dispenser and liquid container.

Advantageously, prior to inserting the liquid container into the housing, the following step is carried out:

shifting the actuating device into the insertion position of the liquid container, or ensuring that the actuating device has been shifted into the insertion position of the liquid container.

In particular, prior to inserting the liquid container into the housing, the following step can be carried out:

swiveling the actuating device into the insertion position of the liquid container, or ensuring that the actuating device has been swiveled into the insertion position of the liquid container.

Furthermore, in particular after inserting the liquid container into the housing, the following step can be carried out:

swiveling the actuating device into the actuating position of the liquid dispensing device.

Alternatively, prior to inserting the liquid container into the housing, the following step can be carried out:

removing the cover with the actuating device from the liquid container, or ensuring that the cover with the actuating device has been removed from the liquid container.

Furthermore, alternatively, after inserting the liquid container into the housing, the following step can be carried out:

placing the cover on the housing and thus moving the actuating device into the actuating position of the liquid dispensing device.

In the following, exemplary embodiments of the liquid dispenser, the liquid container and the tap system according to the invention are explained more closely with the aid of drawings. In all the figures, corresponding items or elements are denoted with the same reference numerals. It should be understood that the present invention is not limited to the exemplary embodiments described below, and that individual features thereof can be combined to form further exemplary embodiments.

Figure 2:
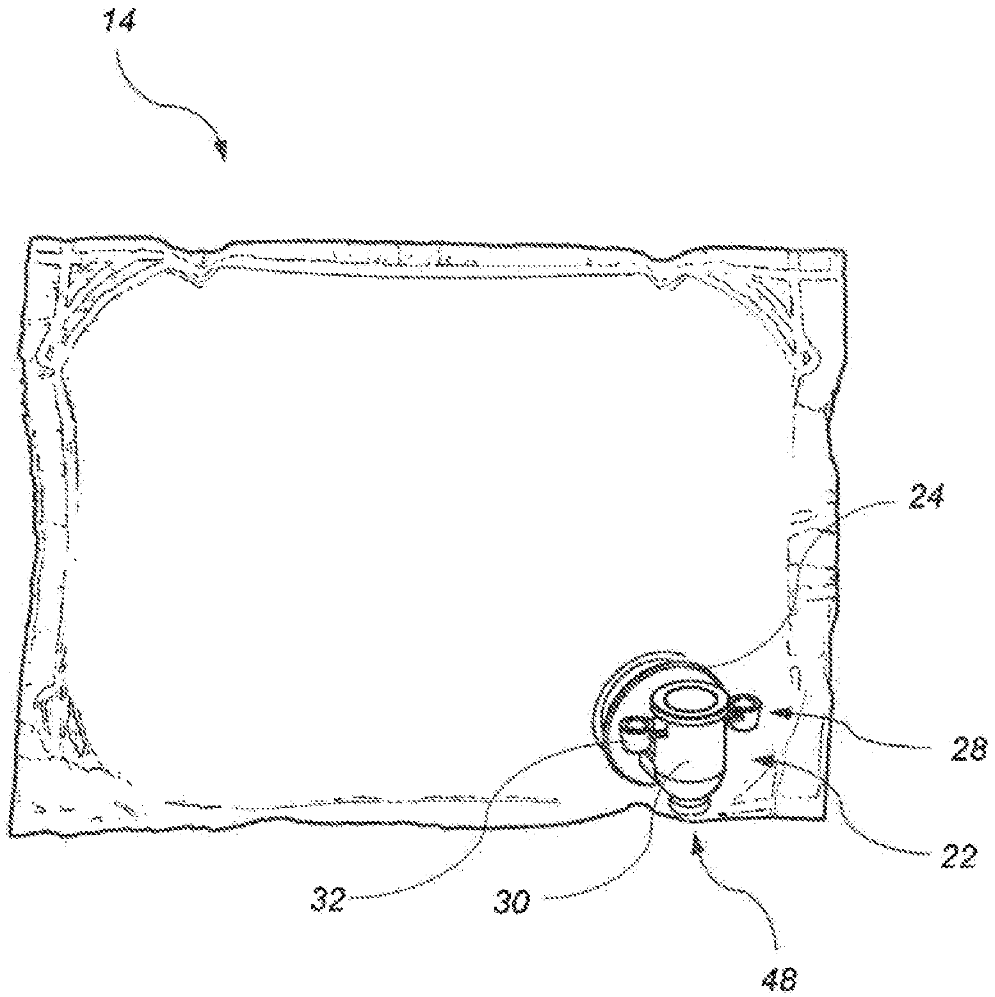
Figure 3:
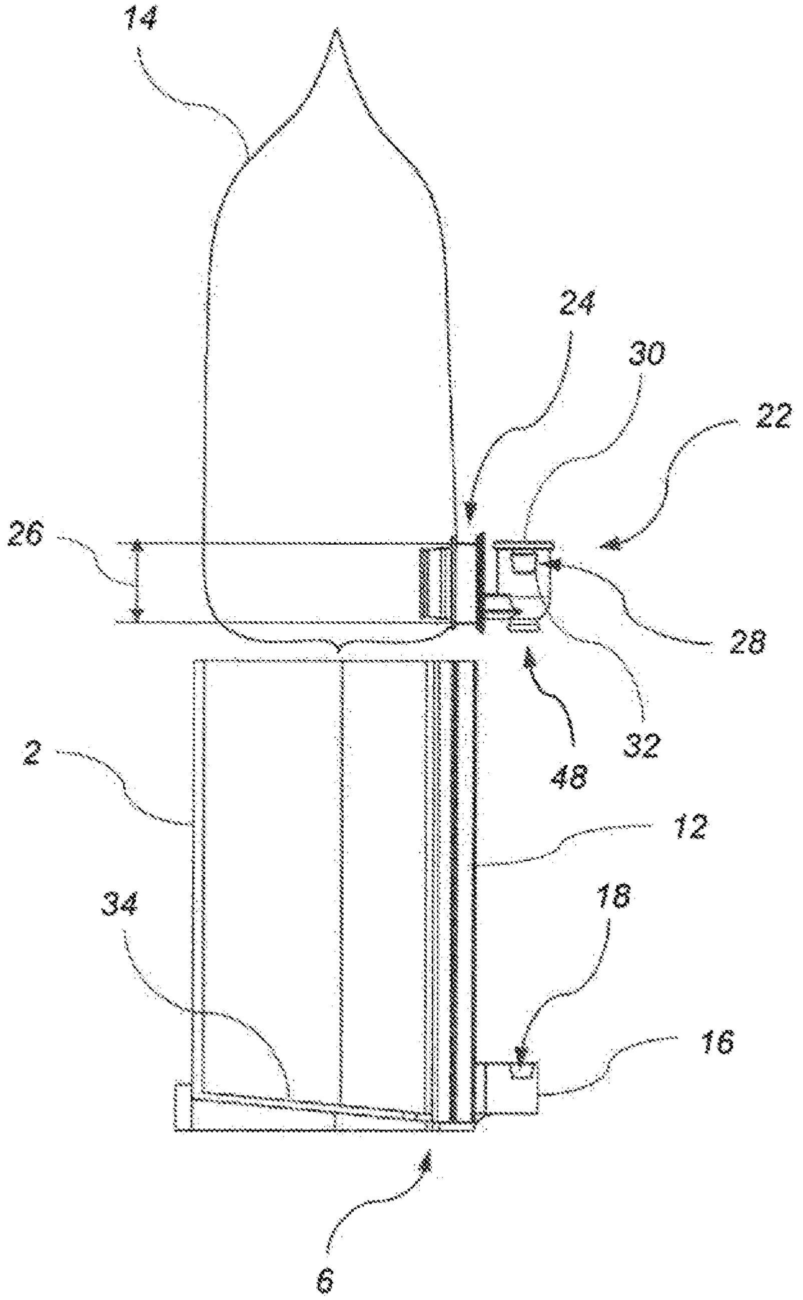
Figure 4:
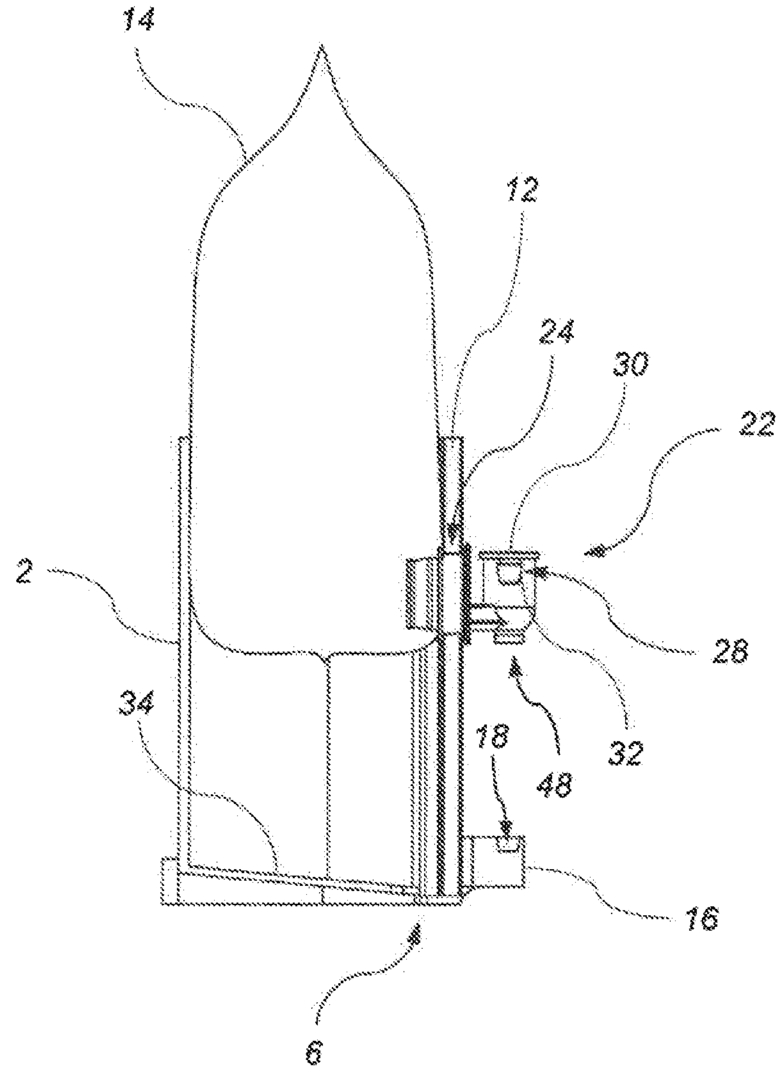
Figure 5:
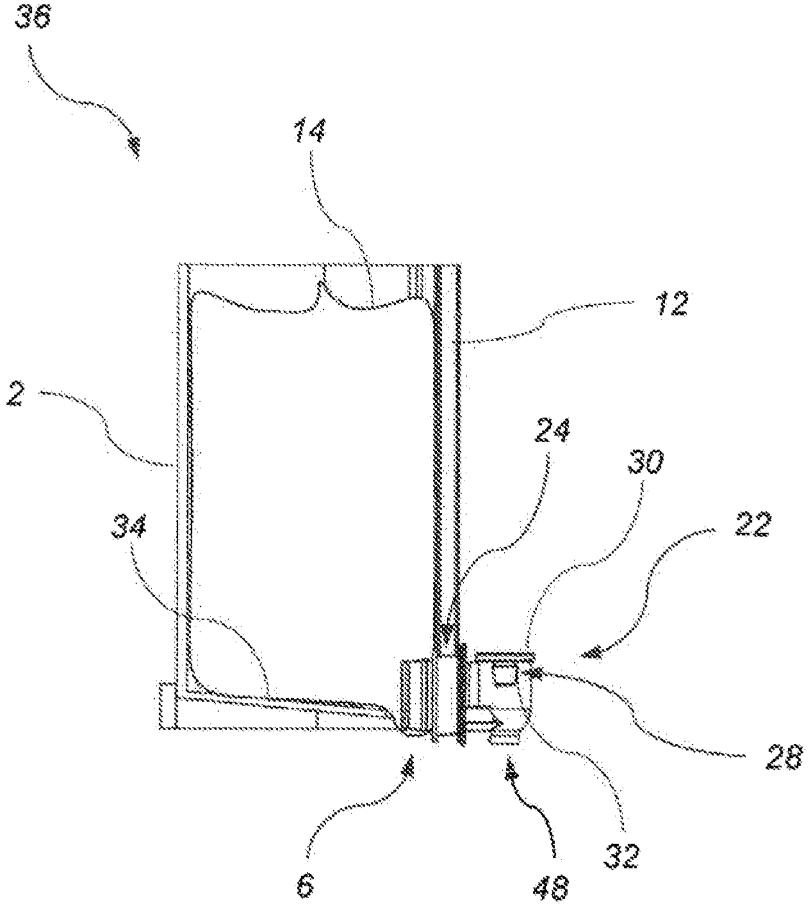
Figure 6:
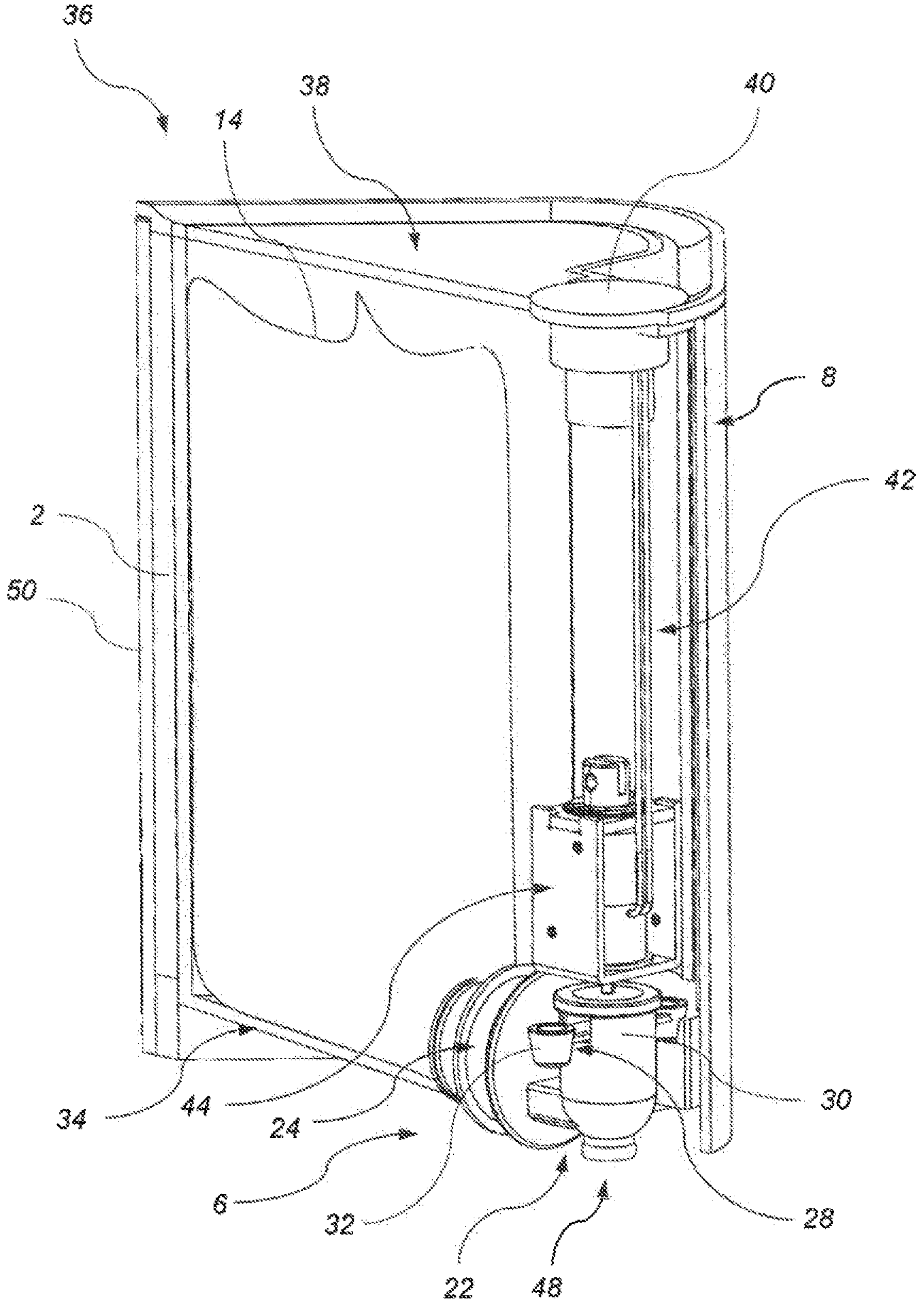
Figure 7:
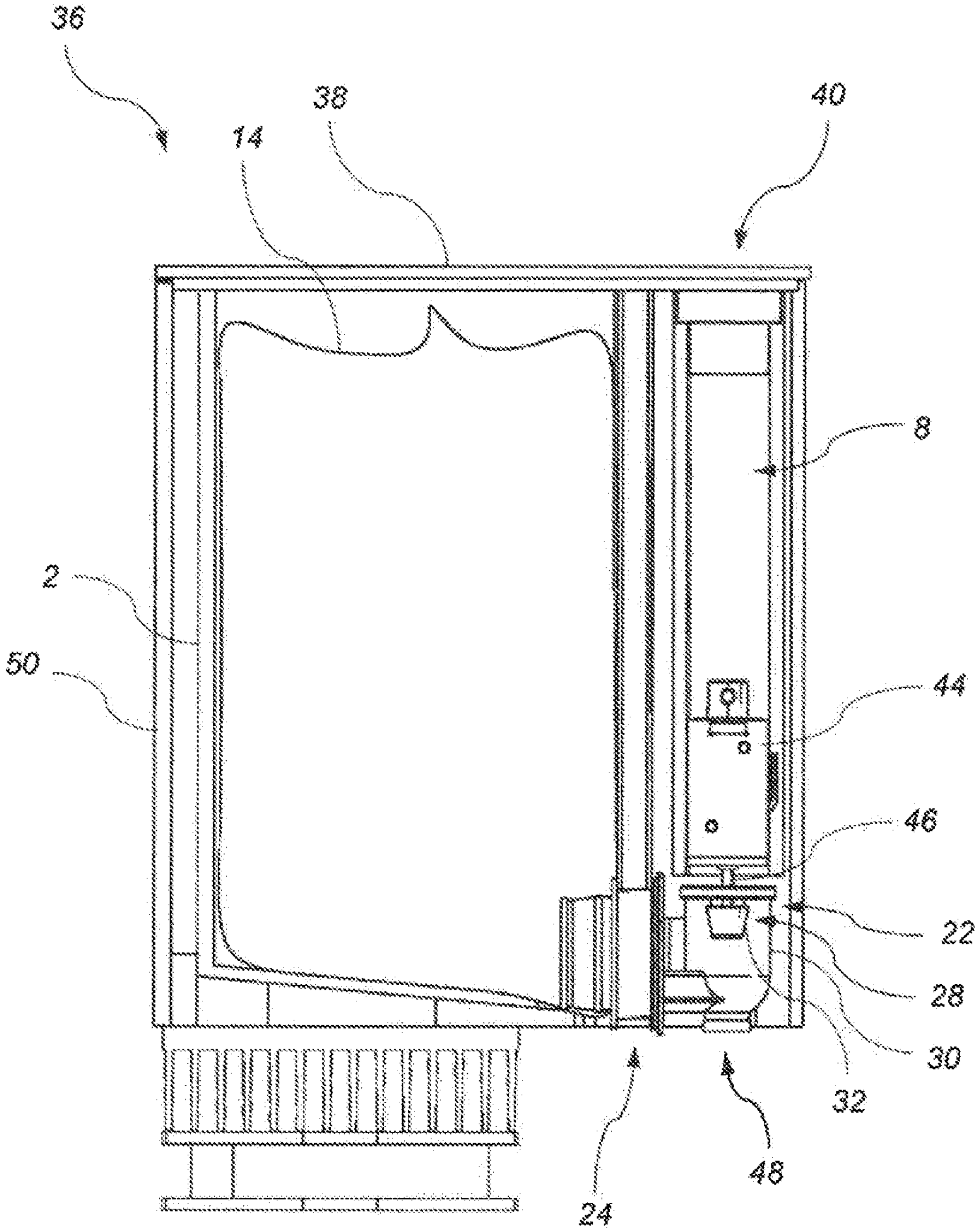
Figure 8:
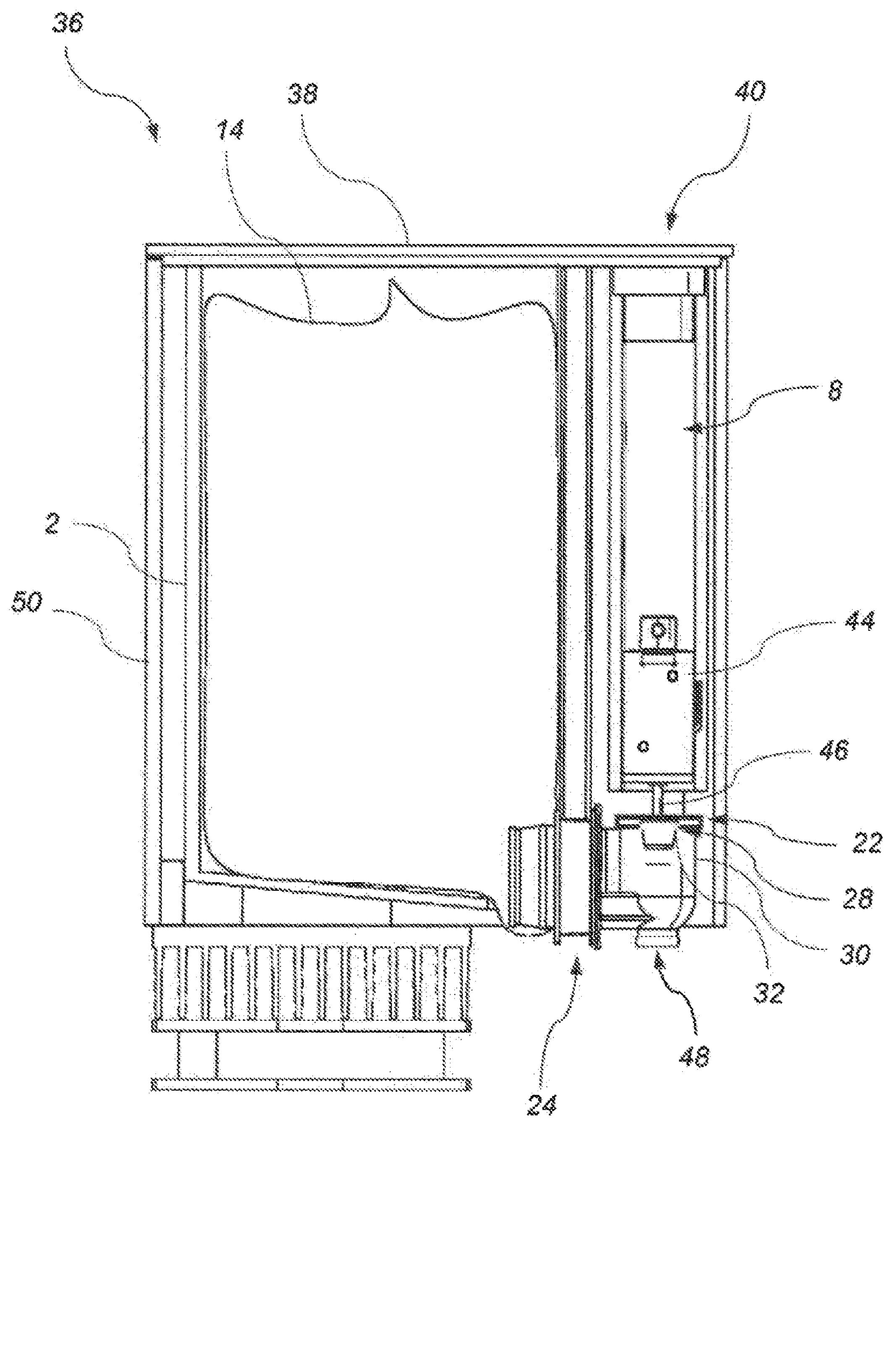
Figure 9:
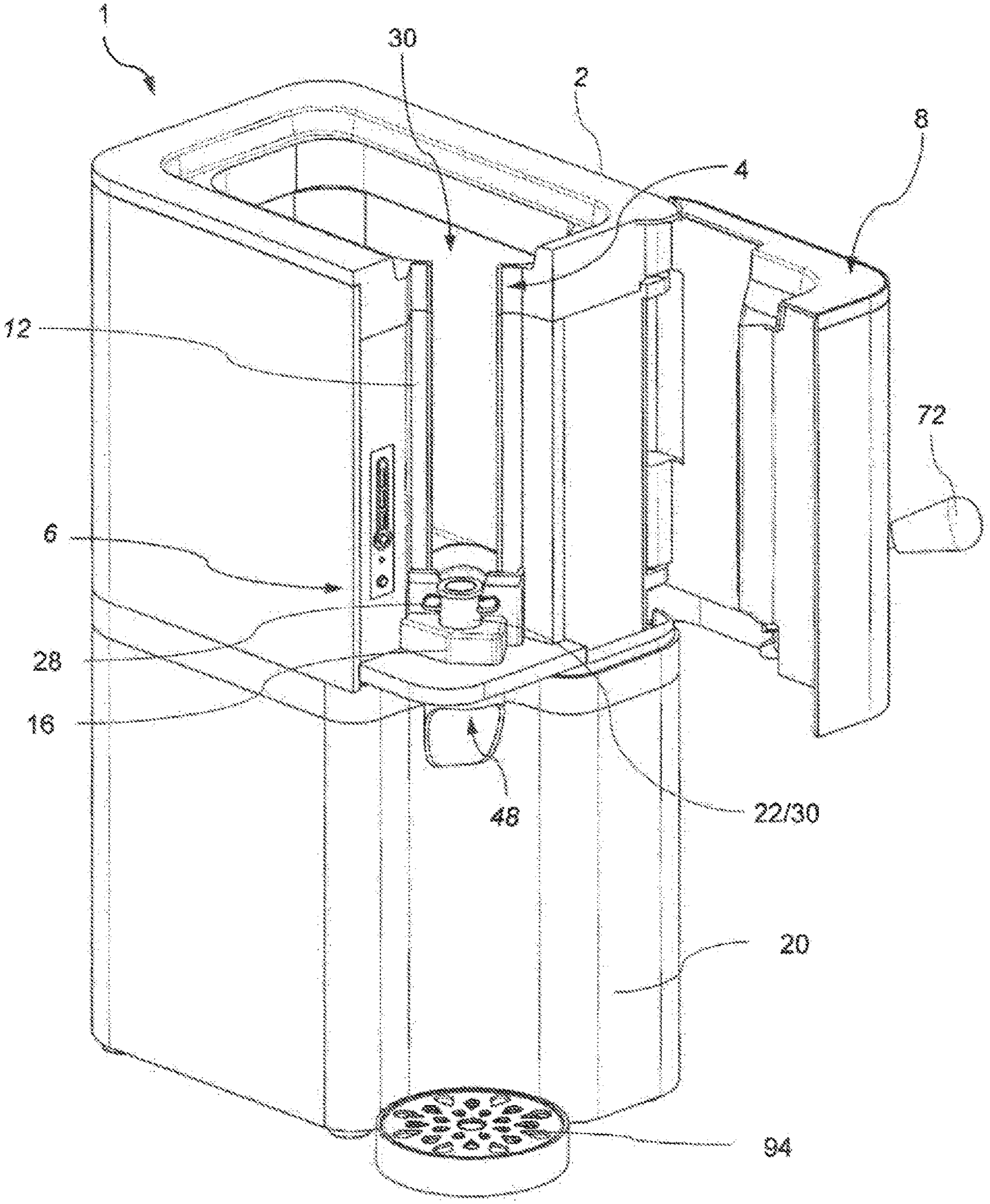
Figure 10:
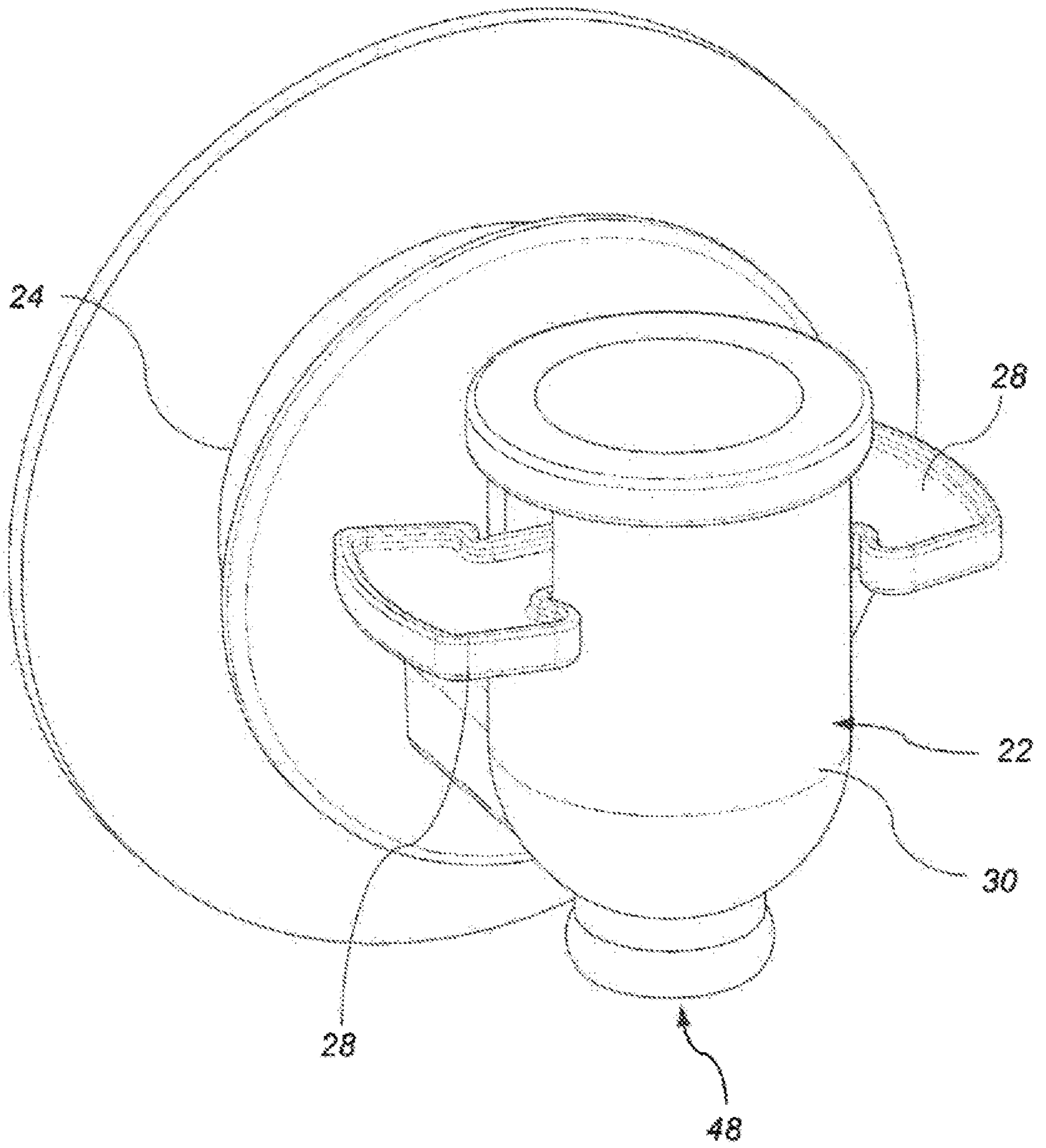
Figure 11:
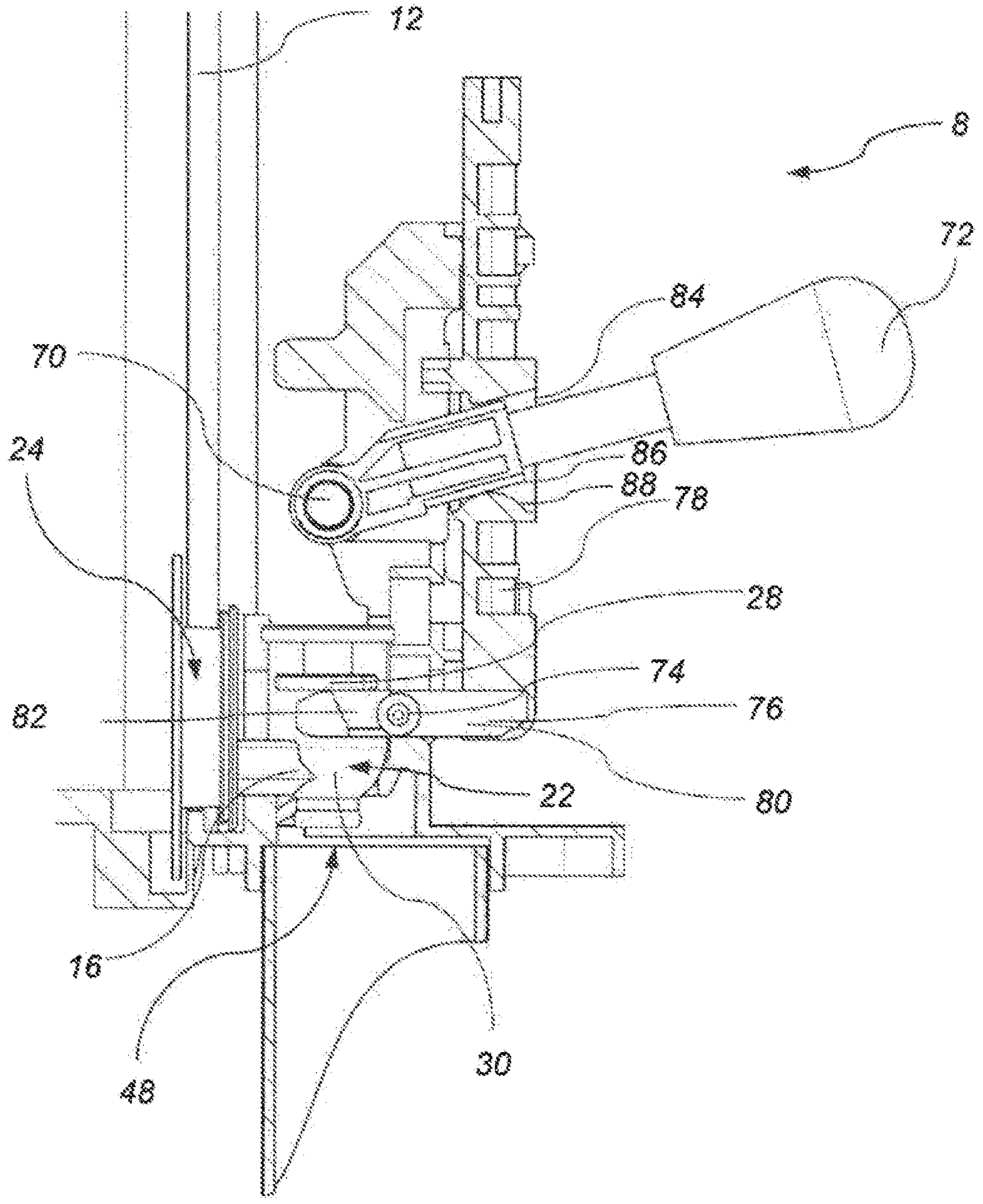
Figure 12:
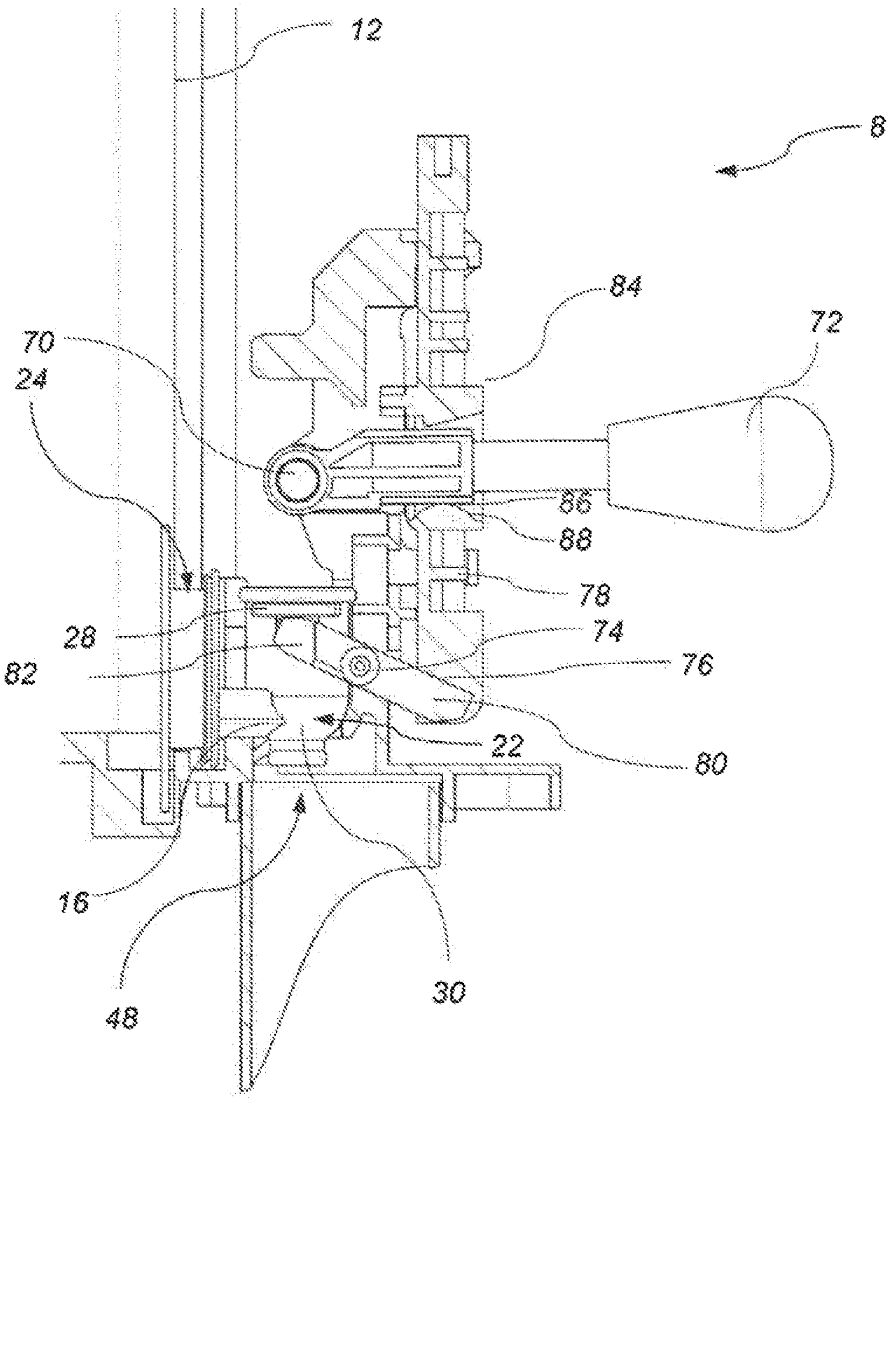
Figure 13:
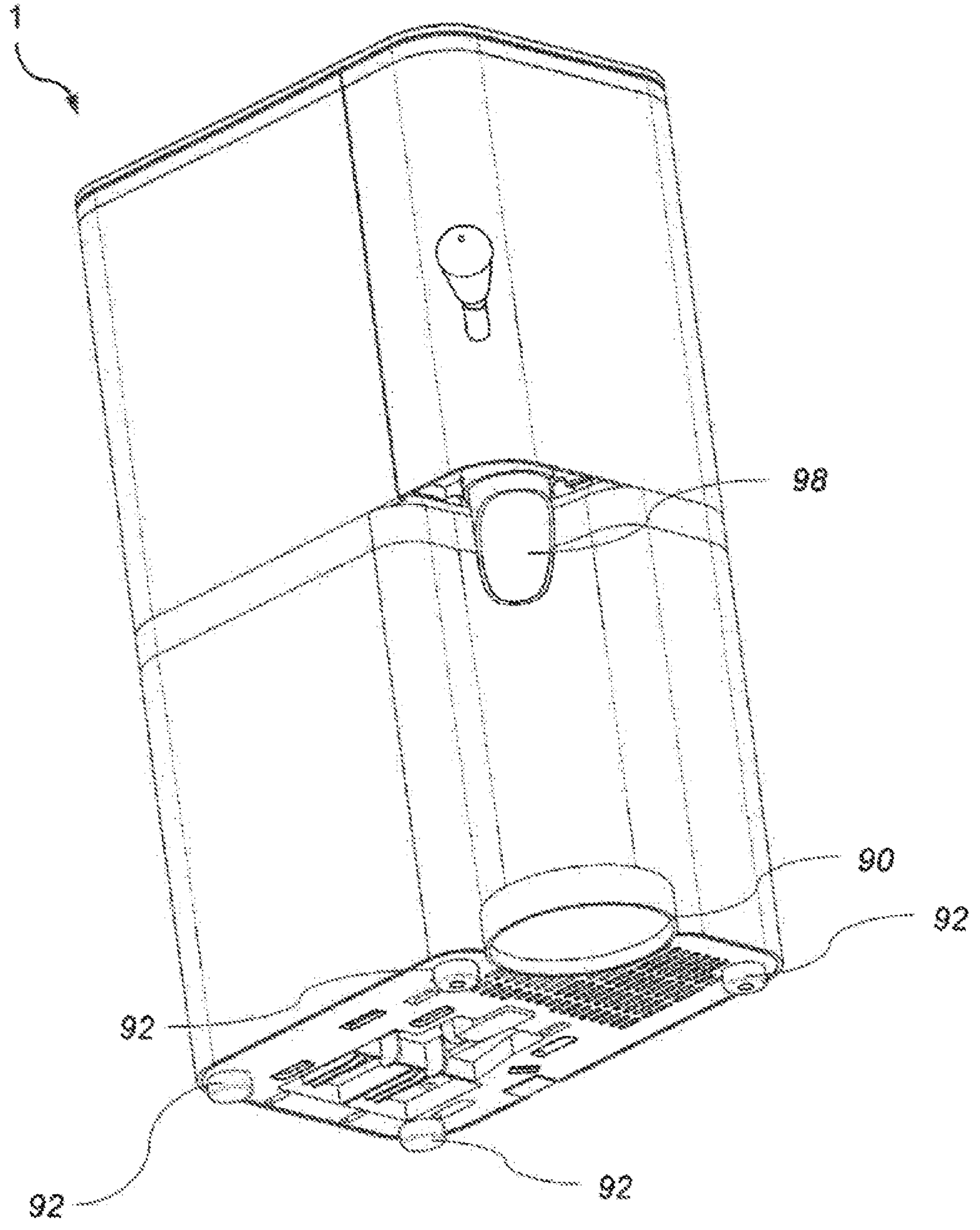
Figure 14:
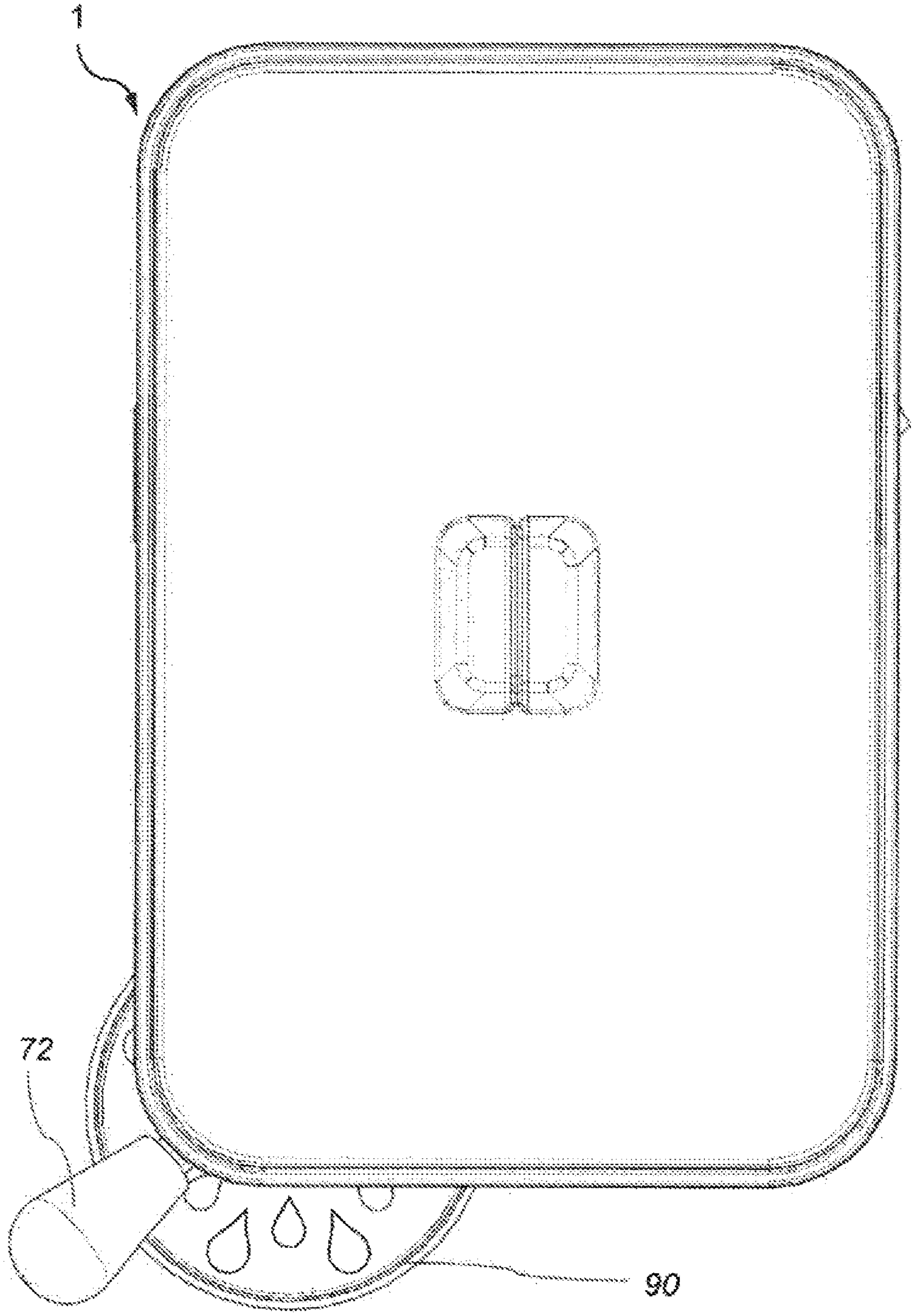
Figure 15:
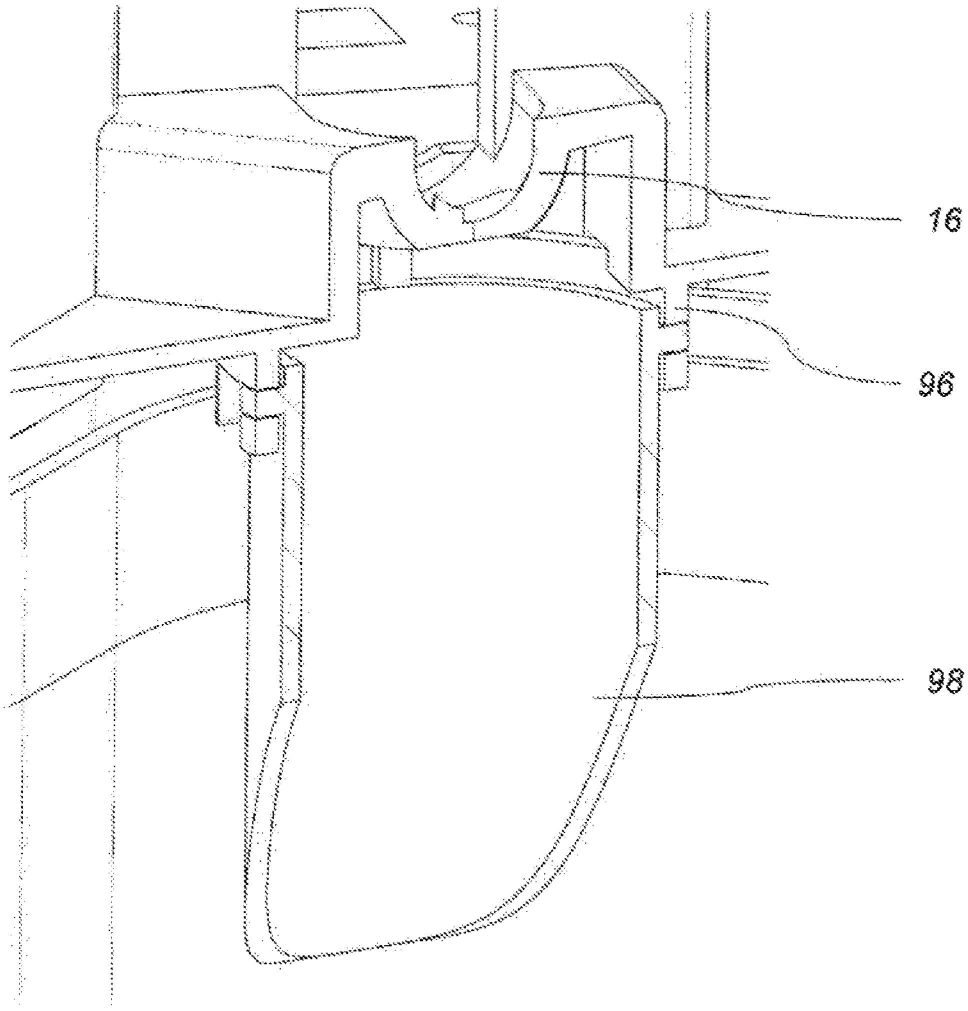

In the figures:

FIG. 1 a three-dimensional view of a liquid dispenser according to the invention according to an exemplary embodiment of the invention:

FIG. 2 a top down view on a filled liquid container according to an exemplary embodiment of the invention:

FIG. 3 a side view of a liquid dispenser shown in sections according to a further exemplary embodiment of the invention, depicting inserting the liquid container of FIG. 2 in a first stage, FIG. 4 a side view of the liquid dispenser of FIG. 3, wherein inserting the liquid container of FIG. 2 is depicted in a second stage, FIG. 5 a side view of the liquid dispenser of FIG. 3, wherein inserting the liquid container of FIG. 2 is depicted in a third stage, FIG. 6 a three-dimensional view of a half-section of the tap system of FIG. 5, FIG. 7 a side view of the half-section of the tap system of FIG. 5 with a non-actuated liquid dispensing device, FIG. 8 a side view of the half-section of the tap system of FIG. 5 with an actuated liquid dispensing device, FIG. 9 a further embodiment of the liquid dispenser according to the invention, FIG. 10 a further embodiment of a liquid dispensing device for use with the liquid dispenser shown in FIG. 9, FIGS. 11 and 12 an actuating process of an actuating device of the liquid dispenser shown in FIG. 9, FIG. 13 a view of the bottom side of the liquid dispenser, FIG. 14 a view of the top side of the liquid dispenser, and FIG. 15 a grommet quick connector with attached grommet.

The three-dimensional view shown in FIG. 1 for a liquid dispenser 1 according to the invention according to an exemplary embodiment of the invention illustrates a housing 2 of liquid dispenser 1 having a guide device 4 and an actuating device 8 in a liquid dispensing region.

Housing 2 is substantially rectangular in shape and is beveled at one corner in liquid dispensing region 6.

Preferably, housing 2 can have a receiving space 3, and in the position of use of liquid dispenser 1 a liquid container 14 as shown in FIG. 2 is able to be inserted into the receiving space 3 preferably in a vertically downward movement.

Furthermore, receiving space 3 can be bounded downward in the vertical direction by a bottom 34, on which liquid container 14 inserted in liquid dispenser 1 preferably rests. Viewed in the position of use of liquid dispenser 1, receiving space 3 is bounded laterally or horizontally at least in sections by a first side wall 68, a second side wall 62, a third side wall 64 and a fourth side wall 66 of housing 2, wherein liquid container 14 inserted in receiving space 3 abuts at least in sections against the inside of side walls 60 to 66. In particular, first side wall 60 and second side wall 62 of receiving space 3 can be arranged opposite each other, preferably running substantially parallel to each other and/or vertically. Viewed in the position of use of liquid dispenser 1, first side wall 60 and second side wall 62 can have different length in the horizontal direction. Furthermore, preferably vertically running third side wall 64 of receiving space 3 may comprise guide device 4 and connect first side wall 60 to second side wall 62. Furthermore, preferably vertically running fourth side wall 66 of receiving space 3 can be arranged opposite third side wall 64 and connect first side wall 60 to second side wall 63. Preferably, third and fourth side walls 64 and 66 are not arranged parallel to each other, in order to form the beveled corner. In particular, third side wall 64 can be oriented or arranged such, in regard to first 60 and second side walls 62, that corresponding planes formed by first, second, and third side walls 60-64 are not perpendicular to each other. Furthermore, fourth side wall 66 can be oriented or arranged such, in regard to first 60 and second side walls 62, that corresponding planes formed by first, second, and fourth side walls 60/62/66 are perpendicular to each other. Preferably, the transitions between side walls 60 to 66 and/or to bottom 34 are rounded. This ensures better accessibility to liquid dispensing region 6. Furthermore, liquid container 14 can abut better against the inside of housing 2.

Preferably, side walls 60 to 66 and/or bottom 34 can be made at least in sections and/or entirely of a thermal insulation material. Thus, advantageously, a thermal insulation of the liquid container can be achieved, so that energy consumption for reaching and maintaining a target temperature of the liquid of the liquid container can be reduced, for example.

Guide device 4 is designed, according to the exemplary embodiment shown, as two guide rails 12 spaced apart from each other with an effective spacing 10, guide rails 12 having a rectangular cross section. Effective spacing 10 here corresponds to a clear distance between guide rails 12.

Between guide rails 12, a liquid container 14 with its liquid dispensing device 22 (see FIG. 2) not shown here can be guided during the inserting process.

In the exemplary embodiment shown, actuating device 8 is pivotably mounted on housing 2 and can pivot between an insertion position for inserting liquid container 14 and an actuating position for actuating liquid dispensing device 22.

Furthermore, housing 2 has an end stop 16, by means of which liquid dispensing device 22 of liquid container 14 can be positioned in its end position.

End stop 16 has a positioning section 18 formed complementary to a positioning section 32 of liquid dispensing device 22, in order to establish the position of liquid dispensing device 22 in relation to guide device 4 and/or actuating device 8. Complementary positioning section 18 can have two negatively conical receiving sections 18, in which valve opening elements 28 of liquid dispensing device 22 as described in FIG. 2 can be received by their positioning sections 32 in the end position of liquid dispensing device 22.

Housing 2 is placed on a frame housing 20, and in this way the height of the liquid dispensing device of the liquid container inserted in housing 2 can be influenced, in particular such that a vessel (not shown) for filling with the liquid can be placed under housing 2.

Filled liquid container 14 shown in a top down view in FIG. 2 is rectangular in shape, as shown in the exemplary embodiment, in particular in the unfilled state, its liquid dispensing device 22, viewed top down, being formed in a corner region of liquid container 14. A dispensing opening 48 of liquid dispensing device 22 can be oriented in the direction of the closest marginal region of liquid container 14.

As is further shown, liquid container 14 is largely flexible in shape, for example, as a bag made from plastic film. For example, the liquid container can be made from two or more film elements being joined together at their marginal regions, for example by welding and/or gluing, in order to form liquid container 14.

A guide flange 24 of liquid dispensing device 22 is round, viewed from the front, and formed with a U-shaped cross section on its outer circumference, in order to be able to be guided by guide device 4 described for FIG. 1 when liquid container 14 in inserted in housing 2. An effective outer diameter 26 (see FIG. 3) is measured in this case down to the bottom of the U-shaped opening.

Liquid dispensing device 22 has two valve opening elements 28, by means of which liquid dispensing device 22 can be positioned in its end position in liquid dispenser 1 against an end stop 16 of liquid dispenser 1.

As shown in this exemplary embodiment, valve opening elements 28 are formed at the side, protruding beyond a valve housing 30 of liquid dispensing device 22, and have a positively conical positioning section 32.

In this exemplary embodiment, valve opening elements 28 are connected as a single piece to a valve body (not shown) arranged in valve housing 30. A relative movement between valve opening elements 28 and valve housing 30 shifts the valve body, not shown here, from its tight seat to open up a dispensing opening 48 of liquid dispensing device 22.

FIG. 3 shows a side view of a liquid dispenser 1, shown in a sectional representation, according to a further exemplary embodiment of the invention, inserting liquid container 14 of FIG. 2 being depicted in a first step.

In the case of liquid dispenser 1 according to the further exemplary embodiment, contrary to liquid dispenser 1 according to the exemplary embodiment shown in FIG. 1, actuating device 8 is not attached to the housing 2, but instead on a cover 38 not shown in FIG. 3 (see FIG. 6), which is removed from housing 2 for inserting liquid container 14. Frame housing 20 is also not shown in FIG. 3.

Housing 2 of liquid dispenser 1 according to the further exemplary embodiment shown in FIG. 3 likewise has a bottom 34 falling off in the direction of liquid dispensing region 6, just as housing 2 of liquid dispenser 1 according to the exemplary embodiment shown in FIG. 1.

The bottom can have a slope of at least about 2%, preferably at least about 4% and particularly preferably at least about 8%. Moreover, the slope can be at most about 18%.

Liquid container 14 is positioned on top of housing 2 such that liquid dispensing device 22 is on top of guide device 4. Furthermore, guide flange 24 is aligned with guide device 4.

The side view of liquid dispenser 1 of FIG. 3, as shown in FIG. 4, depicts inserting the liquid container of FIG. 2 in a second step.

Liquid container 14 is partly inserted in housing 2, liquid dispensing device 22 being guided by its guide flange 24, here U-shaped in cross section, between guide rails 12 of guide device 4, here rectangular in cross section.

Liquid container 14, largely flexible in shape, adapts to an inner shape of housing 2 when inserted into housing 2.

The side view of liquid dispenser 1 of FIG. 3, as shown in FIG. 5, depicts inserting the liquid container of FIG. 2 in a third step. In other words, FIG. 5 shows a side view of a tap system 36 according to an exemplary embodiment of the invention, wherein liquid container 14 of FIG. 2 is inserted into liquid dispenser 1 of FIG. 3.

Liquid container 14, largely flexible in shape, is adapted in particular to bottom 34 with the slope in the direction of liquid dispensing region 6. Thus, a residual amount of the liquid in liquid container 14 can collect at the lowest point of housing 2 in liquid dispensing region 6 and be available for removal from liquid container 14.

As shown in FIG. 6 in a three-dimensional view of a half-section of tap system 36 of FIG. 5, liquid dispensing device 22 of liquid container 14 inserted in housing 2 is positioned at its end position, wherein valve opening elements 28 of liquid dispensing device 22 abut against end stop 16.

Valve opening elements 28 protruding at the side from liquid dispensing device 22 are received here by their positively conical positioning sections 32 in the corresponding negatively conical receiving sections 18 of end stop 16.

Actuating device 8 is arranged in cover 38 of housing 2, cover 38, after inserting liquid container 14, being placed on top of housing 2 for actuating liquid dispensing device 22.

As shown in this exemplary embodiment, actuating device 8 is operable by means of an operating element 40 attached to cover 38. Operating element 40 here is designed as a push button. The cover has a circumferential side wall 50, which fully covers the housing here when the cover is placed on it.

As is further shown in FIG. 6, operating element 40 is electrically connected to an actuator 44 by connection cables 42, which actuator 44 is designed here as a servo motor.

Upon actuation, actuator 44 extends an actuating element 46, which is designed here as a piston.

The side view of the half-section of tap system 36 of FIG. 5, shown in FIG. 7, shows unactuated liquid dispensing device 22.

Liquid dispensing device 22 is in its end position, wherein its valve opening elements 28 are received by their positioning sections 32 in receiving sections 18 of end stop 16. Actuating device 8 is arranged by means of cover 38 placed on top of housing 2 such that actuating element 46 is positioned above valve housing 30 of liquid dispensing device 22.

As shown in the side view of the half-section of tap system 36 of FIG. 5, shown in FIG. 8, liquid dispensing device 22 is actuated.

Actuating element 46 has been extended and pushes valve housing 30 down. Valve opening elements 28 are prevented from moving downward by end stop 16 and a relative movement takes place between valve housing 30 and valve opening elements 28. This relative movement shifts the valve body, not shown, from its tight seat to open up dispensing opening 48 of liquid dispensing device 22, so that the liquid can be dispensed from liquid container 14.

FIG. 9 shows a further embodiment of a liquid dispenser 1 according to the invention, wherein in the following only the essential differences from the previous embodiments will be discussed. In particular, end stop 16 is designed to position liquid dispensing device 22 shown in FIG. 10 in its end position, valve housing 30 of liquid dispensing device 22 being positioned at end stop 16. Contrary to the previously described embodiment, valve opening element 28 or valve opening elements 28 are not positioned at end stop 16. As can be seen from FIG. 10, varve opening elements 28 preferably have no positioning section. As shown in particular by FIGS. 11 and 12, valve housing 30 is positioned around dispensing opening 48 at end stop 16. Furthermore, end stop 16 can have an opening (see FIG. 15), through which dispensing opening 48 of liquid dispensing device 22 is guided in the position of use.

Moreover, actuating device 8 is mounted pivotably on housing 2. In the inserting position of actuating device 8 shown in FIG. 9, liquid dispensing device 22 can be removed from housing 2 against the inserting direction or be inserted into housing 2 in the inserting direction.

FIGS. 11 and 12 show actuating device 8 in the actuating position in sectional view. Actuating device 8 is designed to fix the position of liquid dispensing device 22 in relation to housing 2 in the actuating position of actuating device 8. In particular, actuating device 8 prevents liquid dispensing device 22 from being moved against the inserting direction. This can be achieved, for example, in that actuating device 8 contacts a top side of valve housing 30, so that liquid dispensing device 22 is sandwiched between end stop 16 and actuating device 8, Furthermore, actuating device 8 can be designed to lift valve opening element 28 of liquid dispensing device. 22, viewed in the position of use of liquid dispenser 1, for dispensing the liquid.

In particular, actuating device 8 can have an operating lever 72 mounted rotatably about a first axis of rotation 70, a rocker arm 76 mounted rotatably about a second axis of rotation 74, running substantially parallel to first axis of rotation 70, and a force transmitting element 78. Force transmitting element 78 can be changed in its position by operating lever 72 and connected to a first side 80 of rocker arm 76, viewed from second axis of rotation 74. Furthermore, a second side 82 of rocker arm 76, viewed from second axis of rotation 74, can actuate valve opening element 28 of liquid dispensing device 22. In particular, force transmitting element 78 can be shifted by operating lever 72 substantially along the inserting direction. Operating lever 72 can be operated in particular by a user in order to cause dispensing the liquid. It can be provided, in particular, for dispensing the liquid, that operating lever 72, designed preferably as a one-sided lever, is moved in the direction of the inserting direction or downward (see FIG. 12), which produces a corresponding shifting in position of force transmitting element 78. As a result, second side 82 of rocker arm 76 is shifted against the inserting direction, so that valve opening element 28 is likewise moved against the inserting direction, and dispensing the liquid ensues.

Preferably, it can be provided that force transmitting element 78 has an operating lever opening or bushing 84, through which operating lever 72 is guided out of the housing. Furthermore, a contact surface 86 of operating lever 72 at the side of the force transmitting element, with which a force is exerted on a contact surface 88 of force transmitting element 78 at the lever side for dispensing the liquid, being formed at the operating lever opening 84, can run substantially in a straight line, and contact surface 88 at the operating lever side can have a curved profile. Upon actuating operating lever 72 for dispensing the liquid, contact surface 86 at the side of the force transmitting element can be guided at least in sections along contact surface 88 at the side of the operating lever. Due to the curved profile of contact surface 88 at the side of the operating lever, said contact surface can slide particularly easily along contact surface 86 at the side of the force transmitting element, contributing to an easy operability of actuating device 8. Contact surface 88 at the operating lever side is preferably formed on the inside of operating lever bushing 84.

Furthermore, second side 82 of rocker arm 76 can act or push on the underside of valve opening element 28. It should be understood that actuating device 8 can have a separate rocker arm 76 for each valve opening element 28.

As shown n FIG. 13, liquid dispenser 1 can have a stand 90 with a bearing surface 90, which in a positioning of liquid dispenser 1 on a substantially flat positioning surface as intended, makes contact with same. Stand 90 can be provided in particular in addition to further bearing points 92, which are arranged on the bottom side of liquid dispenser 1. By means of bearing points 92 and, stand 90, liquid dispenser 1 can be positioned or set up on the positioning surface.

As can be seen from FIG. 14, bearing surface 90, viewed top down on liquid dispenser 1, is arranged outside the footprint of the top side of liquid dispenser 1. On the other hand, bearing points 92 are arranged inside the footprint. Bearing surface 90 is situated in particular in the region of actuating device 8, in order to stabilize liquid dispenser 1 on the positioning surface and prevent liquid dispenser 1 from tipping over when actuating device 8 is actuated and especially when operating lever 72 is actuated. In particular, bearing surface 90 can be ring-shaped and run outside the footprint at least in sections.

Furthermore, stand 90 can be arranged below dispensing opening 48 and have a drip pan 94 (FIG. 9) for collecting the liquid on one side facing toward dispensing opening 48.

As is shown in FIG. 15, liquid dispenser 1 can have a grommet quick connector 96 for coupling a grommet 98 below end stop 16, grommet 98 being designed as a spray protection against the liquid dispensed by liquid dispensing device 22. In particular, grommet 98 can be beveled, so that the length of grommet 98 near the housing is longer than the outside length. Furthermore, grommet 98 can be arranged below liquid dispensing device 22 or dispensing opening 48.

Furthermore, grommet 98 can be releasable from and connectable to grommet quick connector 96 by a rotary movement.

LIST OF REFERENCE NUMERALS

1 Liquid dispenser
2 Housing
3 Receiving space
4 Guide device
6 Liquid dispensing region
8 Actuating device
10 Effective spacing
12 Guide rail
14 Liquid container
16 End stop
18 Receiving section (complementary to positioning section)
20 Frame housing
22 Liquid dispensing device
24 Guide flange
26 Effective outer diameter
28 Valve opening element
30 Valve housing
32 Positioning section
34 Bottom
36 Tap system
38 Cover
40 Operating element
42 Connection cable
44 Actuator
46 Actuating element
48 Dispensing opening
50 Side wall
60 First side wall
62 Second side wall
64 Third side wall
66 Fourth side wall
70 First axis of rotation
72 Operating lever
74 Second axis of rotation
76 Rocker arm
78 Force transmitting element.
80 First side of rocker arm
82 Second side of rocker arm
84 Operating lever opening or bushing
86 Contact surface on force transmitting element side
88 Contact surface on operating lever side
90 Stand bearing surface
92 Bearing points
94 Drip pan
96 Grommet quick connector
98 Grommet

The invention claimed is:

1. A liquid dispenser for receiving a liquid container and for dispensing a liquid from the liquid container, wherein the liquid dispenser has a housing into which the liquid container is insertable and wherein the housing has, in a liquid dispensing region:

a guide device, by means of which a liquid dispensing device of the liquid container is able to be guided during the insertion of the liquid container into the housing; and an actuating device, by means of which the liquid dispensing device is able to be actuated to dispense the liquid from the liquid container; and wherein the actuating device has:

an operating lever mounted rotatably about a first axis of rotation, a rocker arm mounted rotatably about a second axis of rotation running substantially parallel to the first axis of rotation, and a force transmitting element, the position of which can be changed by the operating lever and which is connected to a first side of the rocker arm, viewed from the second axis of rotation, wherein a second side of the rocker arm, viewed from the second axis of rotation, actuates the valve opening element of the liquid dispensing device.

2. The liquid dispenser according to claim 1, wherein the guide device is designed as guide rails opposite each other and spaced apart from each other.

3. The liquid dispenser according to claim 2, wherein the guide rails are substantially U-shaped in cross section and respective openings of the guide rails are facing each other, or wherein the guide rails are substantially rectangular in cross section.

4. The liquid dispenser according to claim 2, wherein the guide rails have an effective spacing from each other of about 25 mm to 40 mm.

5. The liquid dispenser according to claim 1, wherein the actuating device is configured for shifting between an insertion position for inserting the liquid container and an actuating position for actuating the liquid dispensing device, and wherein the actuating device is attached to a removable cover of the housing, or is attached to be pivotable to the housing.

6. The liquid dispenser (1) according to claim 1, wherein a bottom of the housing has a slope in the direction toward the liquid dispensing region.

7. The liquid dispenser according to claim 1, wherein an end stop is formed in the liquid dispensing region, by means of which the liquid dispensing device of the liquid container can be positioned in its end position.

8. The liquid dispenser according to claim 7, wherein the end stop has a positioning section formed complementarily to a positioning section of the liquid dispensing device, in order to establish the position of the liquid dispensing device in relation to the guide device and/or the actuating device.

9. The liquid dispenser according to claim 1, wherein the force transmitting element comprises an operating lever bushing or opening, through which the operating lever is guided out from the housing, wherein a contact surface of the operating lever at the side of the force transmitting element, with which a force is exerted on the contact surface of the force transmitting element at the lever side for dispensing the liquid, runs substantially in a straight line, and the contact surface at the operating lever side is curved.

10. The liquid dispenser according to claim 1, further comprising a stand having a bearing surface, which in a positioning of the liquid dispenser as intended on a substantially flat positioning surface contacts the same, the bearing surface, viewed top down on the liquid dispenser, being arranged outside the footprint of the top side of the liquid dispenser.

11. A tap system, having:

a liquid dispenser according to claim 1, and a liquid container which is insertable in the liquid dispenser, having a liquid dispensing device for withdrawing a liquid present in the liquid container, wherein the liquid container comprises a guide flange which cooperates with the guide device of the liquid dispenser.

12. The tap system according to claim 11, wherein the actuating direction of the liquid dispensing device of the liquid container, when viewed in its position of use, and a dispensing direction of the liquid are vertically oriented.

13. The tap system (36) according to claim 11, wherein the guide flange, viewed from the front, is substantially round or substantially oval and has an effective outer diameter of about 25 mm to 40 mm.

14. The tap system according to claim 11, wherein the guide flange is formed at its outer circumference with a substantially rectangular cross section or with a substantially U-shaped cross section.

15. A method for inserting a liquid container into a liquid dispenser according to claim 1, the liquid container having a liquid dispensing device for withdrawing a liquid from the liquid container, wherein a guide flange is provided on the liquid dispensing device, by means of which the liquid container is able to be guided and inserted into the liquid dispenser; the method having the step of:

inserting the liquid container into the housing, the guide flange of the liquid container being guided by means of the guide device of the housing.

16. The method for inserting a liquid container according to claim 15, carrying out, prior to inserting the liquid container into the housing, the step of:

shifting the actuating device into an insertion position of the liquid container or ensuring that the actuating device has been shifted into the insertion position of the liquid container.

17. A liquid dispenser for receiving a liquid container and for dispensing a liquid from the liquid container, wherein the liquid dispenser has a housing into which the liquid container is insertable and wherein the housing has, in a liquid dispensing region:

a guide device, by means of which a liquid dispensing device of the liquid container is able to be guided during the insertion of the liquid container into the housing; and an actuating device, by means of which the liquid dispensing device is able to be actuated to dispense the liquid from the liquid container;

wherein the housing comprises a grommet quick connector for coupling a grommet, the grommet being designed as a spray protection against the liquid dispensed by the liquid dispensing device.

* * * * *